3,330,114
MEANS AND TECHNIQUES USEFUL IN PRODUCING EQUAL ENERGY IMPULSES
Malcolm M. McQueen, Northridge, Calif., assignor to Whittaker Corporation, Los Angeles, Calif., a corporation of California
Filed Mar. 5, 1965, Ser. No. 437,468
8 Claims. (Cl. 60—204)

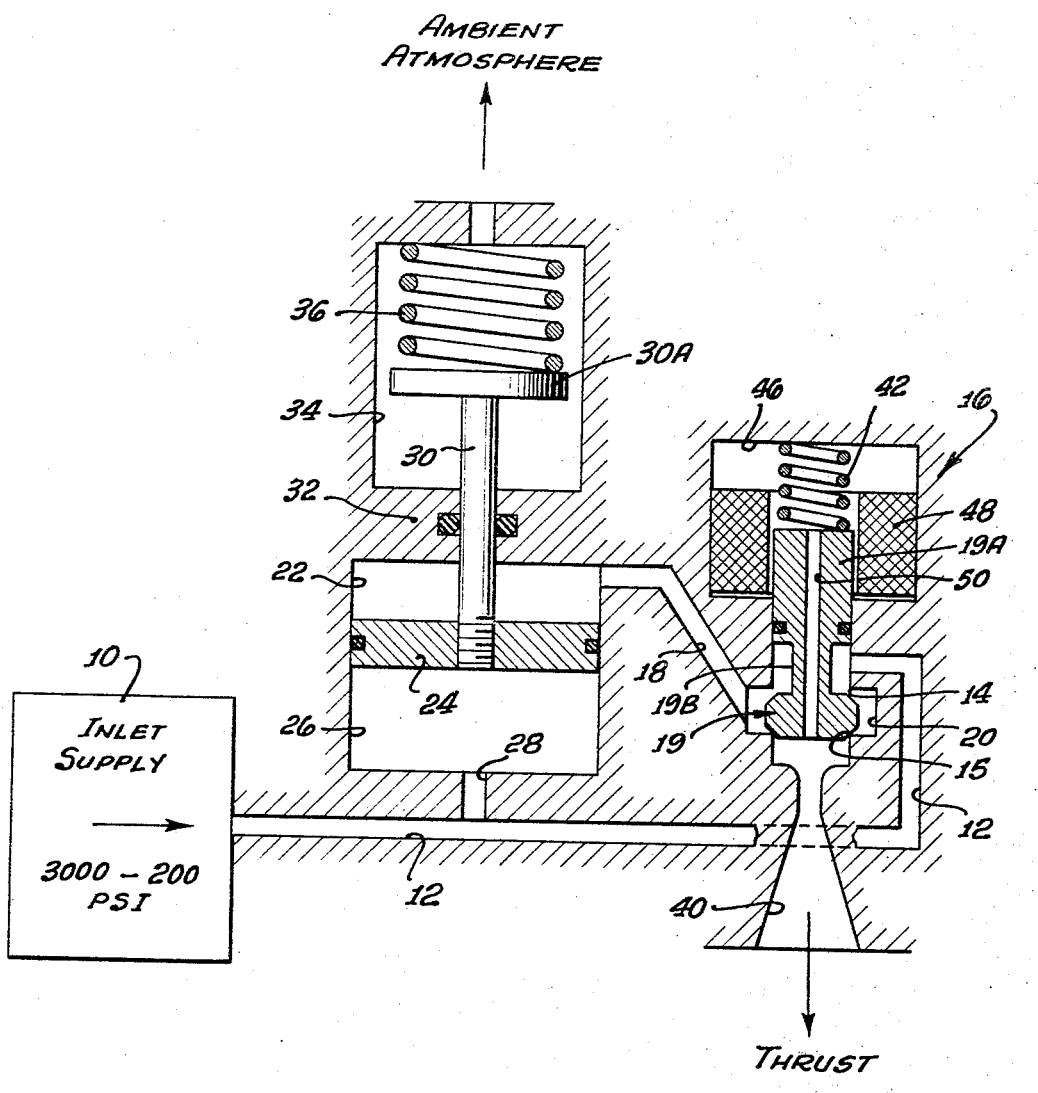

The present invention relates to control systems generally and more specifically to cold gas attitude control systems wherein reaction forces produced by a gas escaping from a nozzle are used as, for example, on a space vehicle, to stabilize or direct its position or flight.

Usually such cold gas attitude control systems involve the use of a gas obtained from a supply such as storage container or bottle on the vehicle. As the gas supply is used, its pressure in the container or bottle decreases. It is, however, advantageous from the standpoint of instrumentation and reproducibility of results to operate the system with reference to a constant pressure, and for the reason heretofore rather elaborate and expensive arrangements have been used involving, for example, presure regulators, time dweil modulated solenoid actuated valves. Such regulators have introduced a source of weight, high cost and are generally regarded as one of the least reliable mechanisms in a cold gas attitude control system. In accordance with important features of the present invention, the need for a pressure regulator and associated relief valves attendant thereto is obviated.

It is therefore a general object of the present invention to provide an improved control system which results in simplification, inexpensivenes, reliability, and less weight.

A specific object of the present invention is to provide an improved control system which requires no pressure regulator and associated relief valves attendant thereto.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

The single figure of the drawings illustrates a system embodying features of the present invention.

As illustrated, the cold gas supply source is represented at 10 in the form of a container or bottle having its outlet in communication with an inlet pipe or conduit 12.

This conduit 12 (shown broken in the drawings) extends to a port 14 of a three-way, two-position solenoid operated valve 16. This port 14 is shown in its open condition wherein the conduit 12 is then in communication with a channel, pipe or conduit 18 extending from the valve chamber 20 to a chamber 22, the chamber 22 being defined in part by the upper side of a movable piston 24 which has its lower side defining a movable wall of a chamber 26. This latter chamber 26 is in constant communication with inlet conduit 12 through chamber inlet opening 28.

Piston 24 sealingly mounted for movement in the expansible chambers 22, 26 has its central rod 30 extending sealingly through a wall portion 32 into an open chamber 34 wherein a prestressed coil compression spring 36 acting between the enlarged rod end 30A and an inner wall portion of chamber 34 tends to move the piston 24 downwardly against gas pressure in chamber 26.

The previously mentioned valve chamber 20 is between the upper valve port 14 and a lower valve port 15 either one of which is selectively closed by the movable valve element 19 which is movable in chamber 20 between the two spaced ports or valve seats 14, 15. The valve seat or port 15 is in constant communication with the inlet opening of nozzle 40 and such port 15 is normally closed by a coil compression spring 42 acting between the upper end of valve punger 19A and casing 46 that houses a coil 48. The valve plunger 19A is slidably and sealingly mounted in the casing 46 and is interconnected with the valve element 19 by an interconnecting portion 19B of reduced diameter. It will be seen that a central bore hole 50 extends through the plunger 19A, valve 19 and interconnecting portion 19B for equalizing pressure at the opposite ends of the movable valve element 19, 19A, 19B.

In the condition shown in the drawings, the line pressure in inlet line 12 which may be anywhere in the range of 3000 to 200 pounds per square inch depending upon the amount of gas remaining in tank 10, is present on both the upper and lower sides of piston 24; and valve element 19 prevents such pressure from leaking through port 15 into nozzle 40.

The particular position assumed by piston 24 in chambers 22, 26 is established by a force balancing system which involves generally the inlet gas pressure in line 12, the diameter of rod 30 which decreases the effective upper area of piston 24 and the force of prestressed spring 36. The higher the pressure in line 12 (also in chamber 22), the more the spring 36 is compressed, and thus the smaller the volume of chamber 22. Likewise, the lower the pressure in line 12 (also in chamber 22), the less the spring 36 is compressed and thus the larger the volume of chamber 22.

In a linear force balancing system, as described, wherein the spring 36, of course, operates within its elastic limits, the product of $P_cV_c$ is constant where $P_c$ is the pressure in chamber 22 and $V_c$ is the volume of chamber 22.

When the coil 48 is energized, the valve element 19 closes port 14 and allows the gas in chamber 22 to escape past port 15 which is in or near the throat of the nozzle 40 to thereby develop an impulse on the space vehicle upon which the above described apparatus is mounted.

It is desired that this impulse be of the same intensity each time the solenoid coil 48 is energized, regardless of the particular pressure of the gas source 10 in the range of 3000 to 200 pounds per square inch; and this desirable feature is accomplished in the present system because the above mentioned product $P_cV_c$ is substantially constant within this range of supply pressure. In these considerations, the volume $V_c$ is considered to be that volume which is opened to the nozzle 40 when the valve element is moved to cover the port 14 and thus includes the volume of passageway 18.

By making the product $P_cV_c$ constant, the same mass of gas is allowed to escape through the nozzle 40 for each valve actuation. Since the same mass of gas is involved in each actuation, the same intensity of impulse is produced on the spacecraft. This follows from the fact that the impulse is equal to the mass of the gas times its change in velocity, but it can be shown that with nozzles discharging into a vacuum, the discharge velocity is substantially constant and independent of pressure, $P_c$. Hence, each valve actuation results in the same intensity of impulse.

It is noted from the foregoing that the system described may be characterized as a variable volume system in that the volume of gas ultimately discharged in operation of the valve is varied in accordance with supply pressure so as to achieve a constant product of volume and pressure.

It will be appreciated that in an equilibrium position of piston 24 (valve element 19 in its position shown in the drawings) the forces acting in opposite directions on the piston 24 are balanced and, indeed, are automatically balanced each time there is a change in pressure in the supply line 12. It may be established that in operation of the force balancing system disclosed the following relation exists, namely, $P_cA=F_s$, where $P_c$ is the pressure in chamber 22; A is the area of rod 30, and $F_s$ is the force produced by spring 36.

When the spring rate of spring 36 is constant, it will be noted that there is a linear relationship between the position of piston 24 and the pressure, $P_c$. In some cases, in order to obtain with exactitude a precise condition wherein $P_cV_c$ remains constant in all equilibrium positions of piston 24 (taking into account, for example, the volume of channel or conduit 18), the spring rate may, for example, be such as to vary accordingly or, for example, the shape of chamber 22 may be such as to obtain this desired result of $P_cV_c$ remaining constant in all equilibrium positions of piston 24.

It will be understood, of course, that means other than a piston and cylinder arrangement may be used. For example, the expansible chambers provided may be expansible chambers of a bellows.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a system of the character described wherein it is desired to produce an energy impulse from a gas discharging through a nozzle from a source of variable gas pressure, the improvement which resides in first introducing the gas from said source into an expansible chamber which is expanded in accordance with the particular value of gas pressure such that the product of the volume of said chamber and the pressure therein remains substantially constant over a range of pressures; and thereafter discharging said gas from said chamber through said nozzle to develop said energy impulse.

2. In a system of the character described, a nozzle; a source of pressure subject to pressure reduction as the gas supply is being depleted; means defining an expansible chamber; means controlling the flow of gas from said source into said expansible chamber; force balancing means responsive to the pressure of said source and automatically adjusting the size of said chamber in accordance with the gas pressure such that the product of the volume of said chamber and the pressure in said chamber remains constant over a substantial range of pressure; and means controlling said flow controlling means to communicate said expansible chamber with said nozzle and to disestablish communication between said source and said expansible chamber.

3. In a system of the character described, a source of gas pressure subject to variation in pressure; a nozzle; force balancing means defining an expansible chamber; means responsive to the pressure of said source and expanding the size of said chamber in accordance with the particular value of gas pressure such that the product of pressure and volume of said chamber remains constant regardless of change in pressure of said source; means introducing said gas from said source into said chamber; and means communicating said chamber with said nozzle.

4. In a system of the character described, comprising a source of gas pressure subject to variation in gas pressure; utilization means; means defining an expansible chamber; means introducing gas from said source into said chamber; force balancing means means responsive to the pressure of said source and controlling the size of said chamber in accordance with the gas pressure such that the product of the volume of said chamber and the pressure therein remains substantially constant over a substantial range of variation of said pressure; and means communicating said chamber with said utilization means.

5. In a method for obtaining the same energy impulse from a source of gas pressure which is subject to change in pressure, the steps including introducing gas from said source into an expansible chamber, controlling the volume of said chamber in accordance with the pressure of said source such that the product of the volume of said chamber and the pressure therein remains substantially constant over a considerable range in variation of gas pressure; and then discharging said gas from said chamber.

6. In a system of the character described, a gas supply source subject to change in gas pressure; a nozzle; a cylinder; a piston in said cylinder and dividing said cylinder into two expansible chambers with said piston forming a wall portion of each of said chambers; conduit means communicating said source with one of said chambers; a two-position three-way valve having a first controlled port in communication with said source and a second controlled port in communication with said nozzle; said valve having a chamber between said first and second ports, and said valve chamber being in communication with said second cylinder chamber; said valve having a movable element, movable to a first position to close said first port and being movable to a second position to close said second port; said piston having a rod extending through said second chamber; and spring means acting on said rod.

7. In a system of the character described wherein it is desired to produce an energy impulse of the same intensity each time a control is operated with said energy impulse being derived from a source of gas pressure, the combination comprising: means defining an expansible chamber; force balancing means responsive to pressure of said source and controlling the volume of said expansible chamber in accordance with the pressure therein such that the product of the volume of said chamber and the pressure therein is substantially constant over a considerable range of gas pressure therein.

8. In a system of the character described, a source of gas pressure subject to variation in pressure; gas utilization means; means defining an expansible chamber; means selectively intercommunicating said expansible chamber either with said gas pressure source or said gas utilization means; means defining a second gas chamber in communication with said gas source; the first mentioned chamber and said second chamber having a common movable wall portion; and spring means acting on said common movable wall portion such that the product of the pressure and volume of said first chamber remains substantially constant regardless of variation in pressure of said source, said utilization means comprising a nozzle for discharging the gas from said expansible chamber into an ambient environment, and said spring means being disposed in said ambient environment.

References Cited

UNITED STATES PATENTS

| | | | |
|---|---|---|---|
| 2,808,699 | 10/1957 | Ivens et al. | 60—39.802 X |
| 2,846,118 | 8/1958 | Matejka | 222—3 |
| 3,072,289 | 1/1963 | Stopp | 222—3 |
| 3,132,767 | 5/1964 | Gardner et al. | 222—3 |

CARLTON R. CROYLE, *Primary Examiner.*